(12) United States Patent
Wirsch, Jr. et al.

(10) Patent No.: US 9,837,868 B2
(45) Date of Patent: Dec. 5, 2017

(54) ROTOR ASSEMBLY FOR AN ELECTRIC MACHINE

(71) Applicant: GE Aviation Systems LLC, Grand Rapids, MI (US)

(72) Inventors: Paul James Wirsch, Jr., Springboro, OH (US); Hao Huang, Troy, OH (US); Xiaochuan Jia, Centerville, OH (US); Jan Zywot, Centerville, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 661 days.

(21) Appl. No.: 14/193,666

(22) Filed: Feb. 28, 2014

(65) Prior Publication Data

US 2015/0249370 A1  Sep. 3, 2015

(51) Int. Cl.
*H02K 3/24* (2006.01)
*H02K 9/197* (2006.01)
*H02K 3/18* (2006.01)
*H02K 3/52* (2006.01)

(52) U.S. Cl.
CPC ............... *H02K 3/24* (2013.01); *H02K 3/527* (2013.01); *H02K 3/18* (2013.01)

(58) Field of Classification Search
CPC   H02K 3/18; H02K 3/24; H02K 3/527; H02K 9/197
USPC .......................................................... 310/54
See application file for complete search history.

(56) References Cited

U.S. PATENT DOCUMENTS

| | | | | |
|---|---|---|---|---|
| 2,524,269 A | * | 10/1950 | Patterson | F04D 9/06 310/54 |
| 3,032,665 A | * | 5/1962 | Wilhelmson | H02K 9/005 310/54 |
| 3,648,085 A | * | 3/1972 | Fujii | H02K 9/19 310/54 |
| 4,496,862 A | * | 1/1985 | Weber | H02K 9/19 310/54 |
| 4,514,652 A | * | 4/1985 | Olson | H02K 5/128 310/113 |
| 4,900,956 A | * | 2/1990 | Gavilondo | H02K 3/24 310/201 |
| 5,003,207 A | | 3/1991 | Krinickas et al. | |
| 5,424,593 A | | 6/1995 | Vaghani et al. | |
| 7,646,119 B2 | * | 1/2010 | Schmidt | H02K 1/32 310/57 |
| 2005/0104470 A1 | * | 5/2005 | Perkins | B60K 7/0007 310/254.1 |
| 2009/0195092 A1 | * | 8/2009 | Gagnon | H02K 3/24 310/54 |
| 2010/0045125 A1 | * | 2/2010 | Takenaka | H02K 1/20 310/54 |

(Continued)

FOREIGN PATENT DOCUMENTS

CA           1066754 A1    11/1979
SU       DE 3234445 A1  *  3/1984  ............... H02K 9/20

*Primary Examiner* — Alex W Mok
(74) *Attorney, Agent, or Firm* — GE Global Patent Operation; William S. Munnerlyn

(57) ABSTRACT

A rotor assembly for an electric machine includes a core having at least one post and a cap wherein electrical windings are wound about the rotor assembly to define a pole. The rotation of the rotor and rotor pole relative to a stator generates a current supplied from the electric machine to a power consuming device.

16 Claims, 7 Drawing Sheets

(56) References Cited

U.S. PATENT DOCUMENTS

| | | | |
|---|---|---|---|
| 2010/0102651 A1* | 4/2010 | Mohle | H02K 3/24 |
| | | | 310/54 |
| 2010/0141062 A1* | 6/2010 | Chamberlin | H02K 1/32 |
| | | | 310/54 |
| 2012/0025639 A1* | 2/2012 | Zywot | H02K 3/527 |
| | | | 310/54 |
| 2013/0207395 A1* | 8/2013 | Huang | H02K 9/19 |
| | | | 290/46 |

* cited by examiner

ROTOR ASSEMBLY FOR AN ELECTRIC MACHINE

BACKGROUND OF THE INVENTION

Electric machines, such as electric motors and/or electric generators, are used in energy conversion. In the aircraft industry, it is common to find an electric motor having a combination of motor and generator modes, where the electric machine, in motor mode, is used to start an aircraft engine, and, depending on the mode, functions as a generator, too, to supply electrical power to the aircraft systems. Regardless of the mode, the machines typically include a rotor having main windings that are driven to rotate by a source of rotation, such as a mechanical or electrical machine, which for some aircraft may be a gas turbine engine.

BRIEF DESCRIPTION OF THE INVENTION

In one embodiment, the invention relates to a rotor assembly for an electric machine including a rotor core having at least one post, a winding wound around the post and having an end portion extending axially beyond the post to define an end turn segment, and a coolant tube having at least a portion in a thermally conductive relationship with at least a portion of the end turn segment, wherein heat from the end turn segment is transferred by conduction to the at least a portion of the coolant tube.

In another embodiment, the invention relates to a rotor assembly for an electric machine including a rotor core having at least one post at least partially defining a first face of a winding seat, at least one coolant tube at least partially defining a second face of the winding seat, and a winding wound around the post and at least partially supported by the winding seat, wherein the winding extending axially beyond the post define an end turn segment. A portion of the at least one coolant tube is in a thermally conductive relationship with at least a portion of the end turn segment.

DESCRIPTION OF EMBODIMENTS OF THE INVENTION

While embodiments of the invention may be implemented in any environment using synchronous electric machine or main machine, a specific example of which is a generator. The generator is currently contemplated to be implemented in a jet engine environment. Embodiments of the invention may alternatively include a starter/generator and may provide turbine engine starting capabilities, wherein the starter/generator provides the mechanical power to drive the turbine engine through a starting method. A brief summary of the contemplated generator environment should aid in a more complete understanding.

Figure 1:
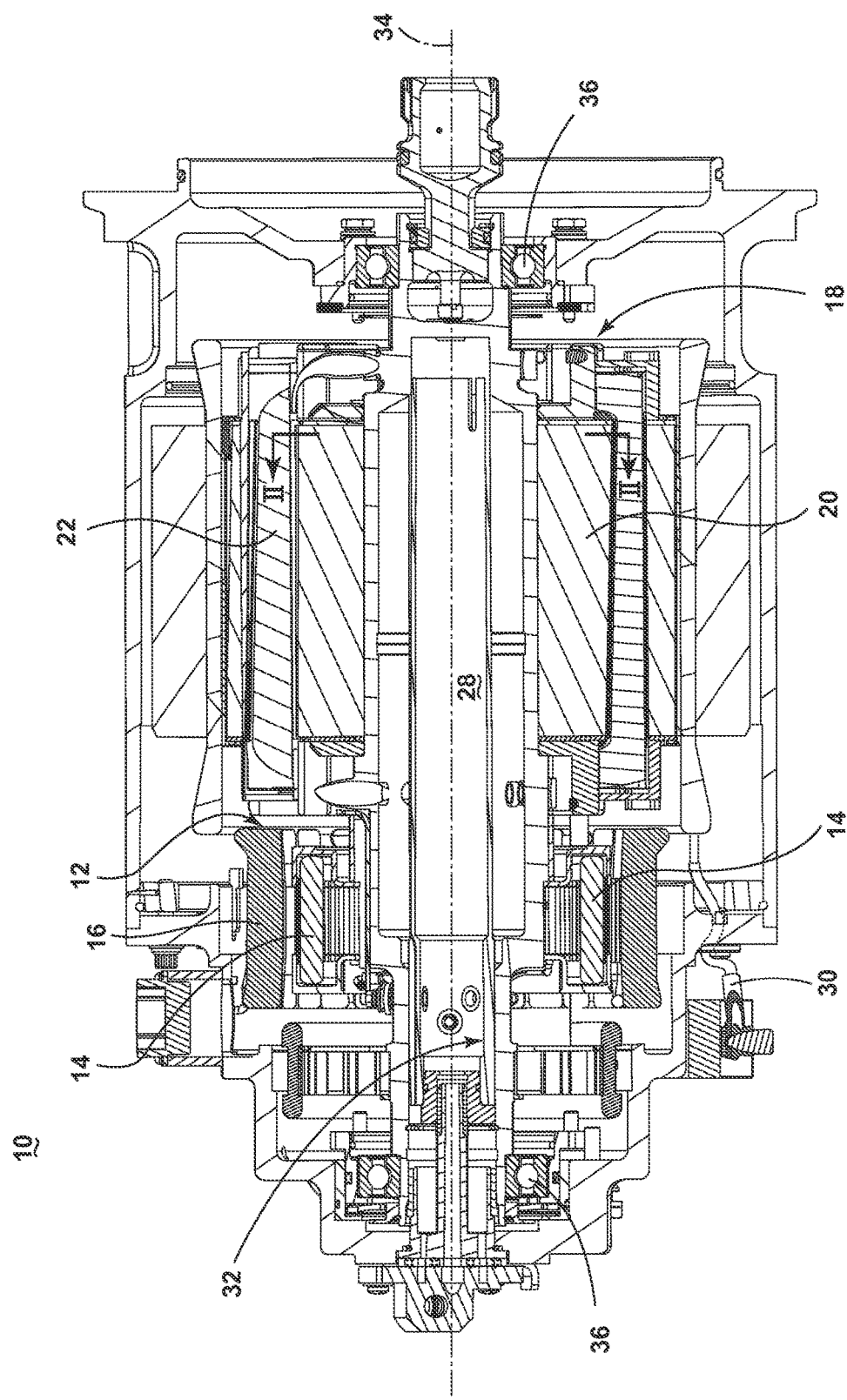
FIG. 1 is a sectional view of an electric machine capable of operation as a starter/generator and having a rotor assembly according to a first embodiment of the invention.

FIG. 1 illustrates an electric machine assembly 10 mounted on or within a gas turbine aircraft engine. The gas turbine engine may be a turbofan engine, such as a General Electric GEnx or CF6 series engine, commonly used in modern commercial and military aviation or it could be a variety of other known gas turbine engines such as a turboprop or turboshaft.

The electrical machine assembly 10 comprises a first machine 12 having an exciter rotor 14 and an exciter stator 16, and a synchronous second machine 18 having a main machine rotor 20 and a main machine stator 22. At least one power connection is provided on the exterior of the electrical machine assembly 10 to provide for the transfer of electrical power to and from the electrical machine assembly 10. Power is transmitted by this power connection, shown as an electrical power cable 30, directly or indirectly, to the electrical load and may provide for a three phase with a ground reference output from the electrical machine assembly 10.

The electrical machine assembly 10 further comprises a rotatable shaft 32 mechanically coupled to a source of axial rotation, which may be a gas turbine engine, about an axis of rotation 34. The rotatable shaft 32 is supported by spaced bearings 36. The exciter rotor 14 and main machine rotor 20 are mounted to the rotatable shaft 32 for rotation relative to the stators 16, 22, which are rotationally fixed within the electrical machine assembly 10. The stators 16, 22 may be mounted to any suitable part of a housing portion of the electrical machine assembly 10. The rotatable shaft 32 is configured such that mechanical force from a running turbine engine provides rotation to the shaft 32. Alternatively, in the example of a starter/generator, rotation of the rotatable shaft 32 of the electrical machine assembly 10 during a starting mode produces a mechanical force that is transferred through the shaft 32 to provide rotation to the turbine engine.

The rotatable shaft 32 may further include a central coolant passage 28 extending axially along the interior of the shaft 32. The central coolant passage 28 allows coolant, for example, oil or air, to flow through the interior of the rotatable shaft 32. In the illustrated embodiment, the second machine 18 is located in the rear of the electric machine assembly 10 and the first machine 12 is positioned in the front of the electric machine assembly 10. Other positions of the first machine 12 and the second machine 18 are envisioned.

Figure 2:
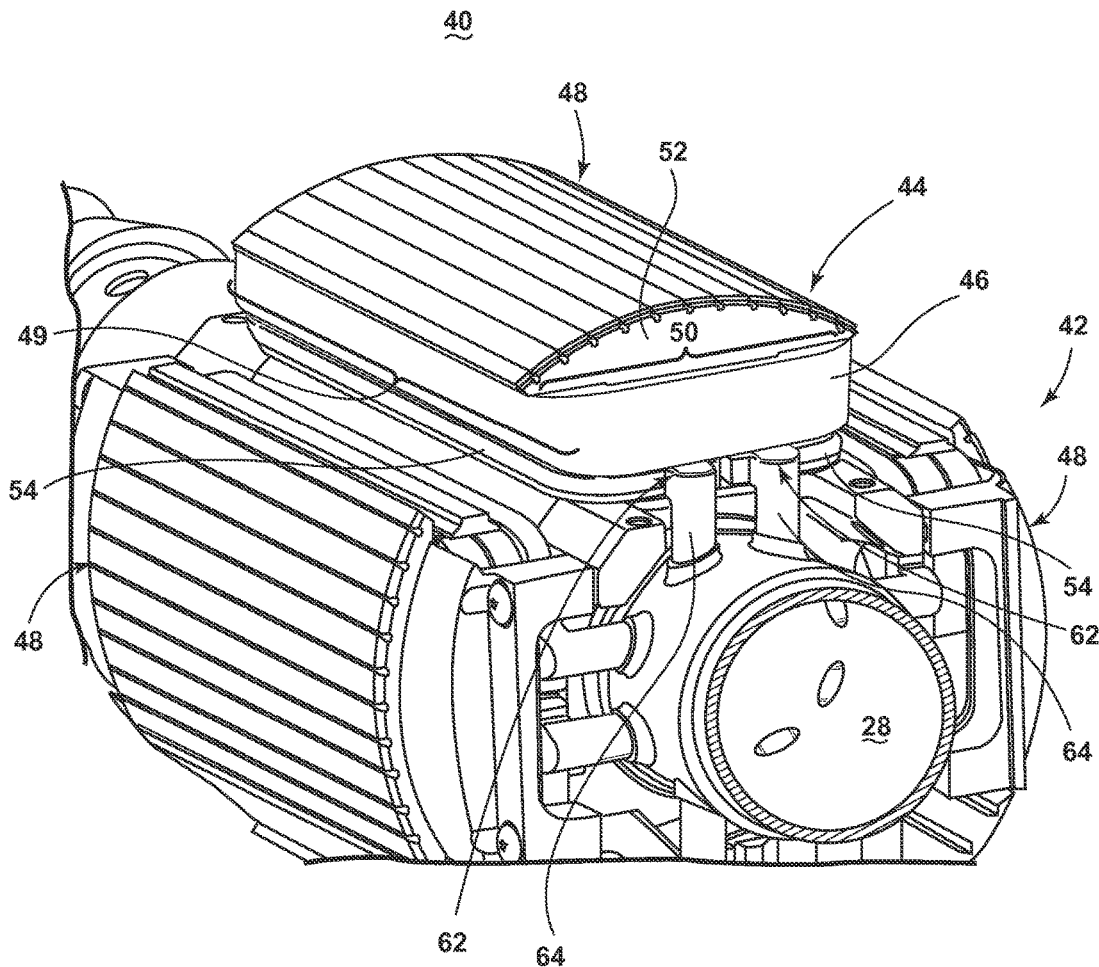
FIG. 2 is a partial perspective view of the rotor assembly of FIG. 1, according to a first embodiment of the invention.

FIG. 2 illustrates a partial perspective view of the main machine rotor assembly 40 with some structural elements of the assembly 40 removed to provide a better view. The rotor assembly 40 is shown comprising a core 42 having at least one post 44 extending radially from the core 42, about which a rotor winding 46 may be wound to define a pole 48 for the assembly 40. Each rotor winding 46, while continuous, can be thought of as having axial segments 49 that run along opposite sides of the pole, with end turn segments 50 connecting the axial segments 49. The end turn segments 50 are often referred to as end turn segments 50 and are where the wires forming the winding wrap around the ends of the pole 48. The end turn segments 50 can be thought of as the portion of the winding that extends beyond the ends of the pole 48 and/or post 44. While only one example of a single rotor winding 46 is illustrated, embodiments of the invention are envisioned having multiple sets or rotor windings configured about the post 44.

The core 42 may be, for instance, molded, formed, or bored from a non-laminated or non-lamination, solid or unitary body material, or a plurality of laminations. One such example of a core body material may be steel. Another such example of a plurality of laminations may include cobalt laminations. Alternate body materials and formations of the core 42 are envisioned, for instance, using additive manufacturing. While a four pole 48 rotor assembly 40 is described having at least one rotor winding 46, alternative rotor assemblies 40 are envisioned having a different number of poles and/or windings 46.

Each pole 48 of the rotor assembly 40 further comprises a cap 52, at least partially overlaying each post 44, pole 48, and rotor winding 46, and at least one coolant tube 54, illustrated as dual coolant tubes 54, at least partially overlaid by the rotor windings 46 and end turn segments 50 and following the same general contours as the windings 46 and segments 50.

Each cap 52 may be formed or comprised by a plurality of laminations, for instance, cobalt laminations, and/or it may be integrally formed with the core 42. In this instance, cobalt laminations may comprise the cap 52 due to its high magnetic and electrical resistance properties, and thus, its ability to minimize eddy currents at the surface of each pole 48. Cobalt laminations are merely one example of a material used to construct the cap 52, and alternate material composition or compositions are envisioned.

Figure 3:
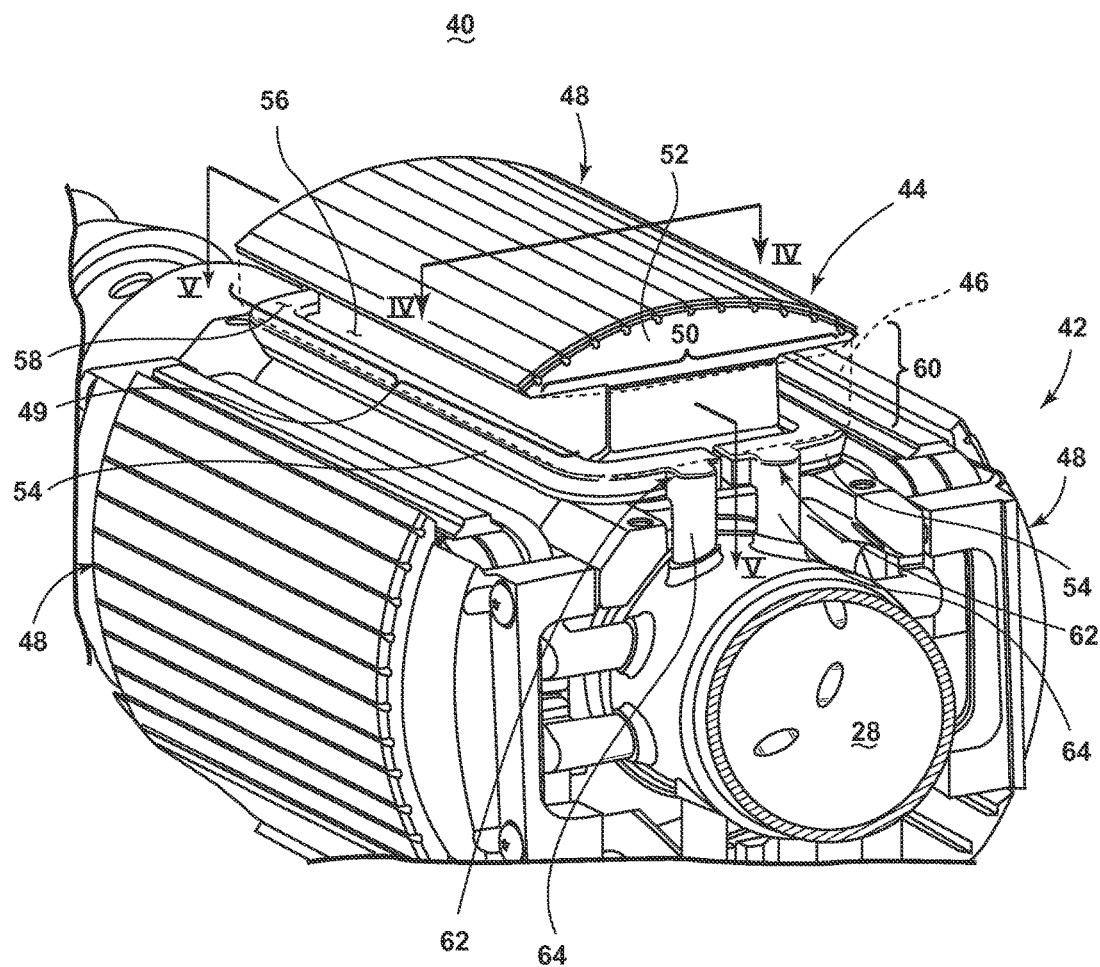
FIG. 3 illustrates a version of FIG. 2 where the rotor windings of the rotor assembly are shown in dashed line to better view the post and coolant tubes aspects.

FIG. 3 illustrates a version of FIG. 2 where the rotor windings 46 are shown in dashed line to better view the post 44 and coolant tubes 54 aspects. As illustrated, the post 44 at least partially defines a first face 56 for receiving the rotor windings 46 and the at least one coolant tube 54 at least partially defines a second face 58 for receiving the rotor windings 46. Collectively, the faces 56, 58 and cap 52 may at least partially define an axially extending winding seat 60 or slot for receiving the rotor winding 46.

The coolant tubes 54 may be located adjacent to, and extending axially in parallel with, the axial segments 49 of the rotor winding 46, as well as at least partially extending in parallel with the end turn segments 50. The coolant tubes 54 may further comprise end tube transitions 62 defining a transition portion of the coolant tube 54 and a transitional flow path, and fluidly coupled with radial coolant passages 64 extending radially from the fluidly coupled central coolant passage 28, such that fluid traversing the coolant tubes 54 may be transitioned toward or away from the rotor windings 46 and/or the pole 48, through the radial coolant passages 64, and into/out of the central coolant passage 28. It is envisioned each axial end of each coolant tube 54 may include an end tube transition 62 and a radial coolant passage 64. The coolant tubes 54, end tube transitions 62, and radially coolant passages 64 may be, for example, molded or formed out of a thermally conductive material such that at least a portion of the coolant tube 54 is in a thermally conductive relationship with at least a portion of the rotor windings 46 and end turn segments 50.

In this sense, the coolant tubes 54, radial coolant passages 64, and central coolant passage 28 at least partially define a coolant loop or path wherein coolant may fluidly traverse, flow, or be forcibly pumped from the central coolant passage 28, through a radial coolant passage 64 and corresponding end tube transition 62, to the coolant tube 54, and returned to the central coolant passage 28 through another radial coolant passage 64 and corresponding end tube transition 62. Alternative flows, paths, and loops of the coolant through the coolant tubes 54, radial coolant passages 64, end tube transitions 62, and central coolant passage 28 are envisioned.

Figure 4:
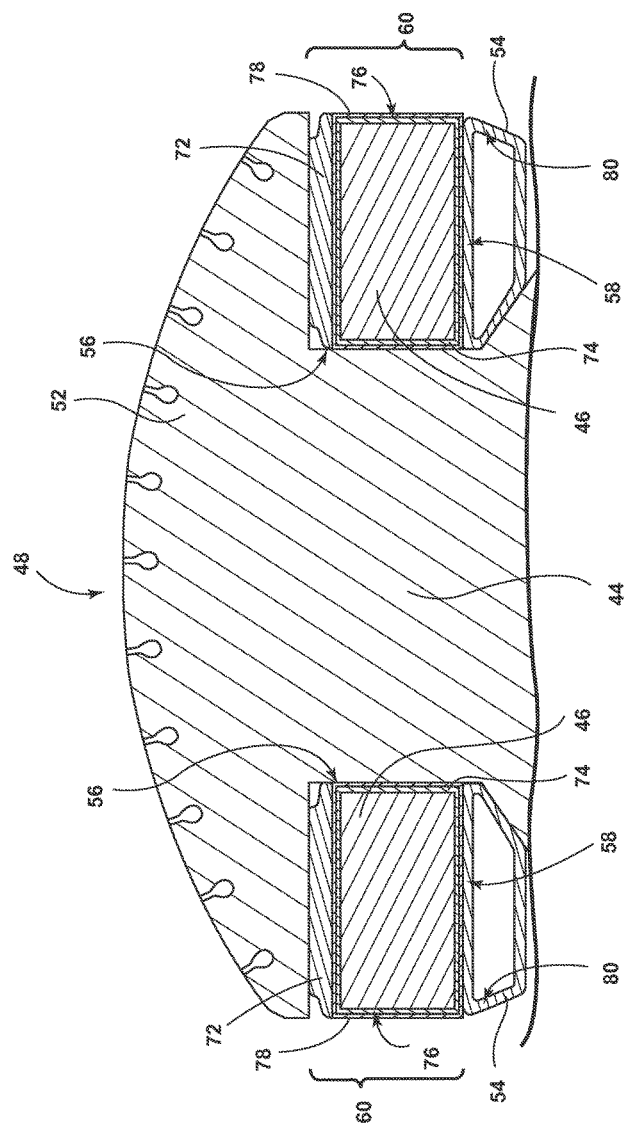
FIG. 4 is a cross-sectional view of the rotor assembly of FIG. 3 sectioned along line 4-4 of FIG. 3, according to a first embodiment of the invention.

Turning now to FIG. 4, one embodiment of the coolant tube 54 is illustrated having a substantially trapezoidal geometric cross section. The illustrated trapezoidal cross section is merely one non-limiting example of a geometric configuration for the coolant tube 54, and alternative cross-sectional shapes, such as a square, rectangular, triangular, circular, hemispherical, etc., are envisioned.

The figure also illustrates the interface of the rotor windings 46 and the coolant tube 54, for example, at the winding seat 60, may further comprise at least a thermally conductive layer provided for separating the rotor windings 46 from the coolant tube 54. As shown, the interface may comprise a thermally conductive, electrically insulating slot liner 74 configured about the rotor windings 46 and a fin assembly 76 configured about the slot liner 74. The fin assembly 76 may further comprise a plurality of thermal fins 78. The configuration of at least one of the slot liner 74 and fin assembly 76 is arranged to physically separate the windings 46 from the post 44, cap 52, and/or coolant tube 54.

It is envisioned at least one of the slot liner 74 and fin assembly 76 is configured to provide a thermally conductive relationship between the rotor windings 46 and the coolant tubes 54; however, additional functionality is envisioned, such as electrical isolation of the windings 46 from additional components, or from additional windings 46. The thermal fins 78 may comprise any thermally conductive material capable of conducting heat from the windings 46 to the coolant tubes 54. Also shown are wedges 72, which may be configured between the cap 52 and rotor windings 46, which may bias the windings 46 toward the coolant tubes 54 to ensure a reliable thermal contact. The slot liner 74, fin assembly 76, fins 78, and wedges 72 are merely one non-limiting example of a configuration of the rotor windings 46 relative to the pole 48 and coolant tubes 54, and alternative configurations with more or fewer of the above-mentioned elements are envisioned.

In the example illustrated, a thermal fin 78 may confront the first face 56 at the post 44 and the second face 58 at the coolant tube 54. Additional configurations may be envisioned to provide for increased thermal conduction, or increased surface area contact, between the rotor windings 46 and the coolant tubes 54. For example, embodiments of the invention are envisioned wherein additional thermal fins 78 may be configured to confront an additional face 80 of the coolant tube 54, and thus provides at least two fins 78 in a thermally conductive relationship with multiple faces 58, 80 of the coolant tubes 54. While a cross-sectional area is shown, it is envisioned that the thermally conductive layer extends along at least a portion of the axial segments 49 of the rotor windings 46, as well as at least a portion of the axial length of the end turn segments 50.

Alternative thermally conductive layer formations and assemblies are envisioned, such as adhesion by glue, mechanical fastening, etc., to provide for a thermally conductive relationship between the windings 46 and the coolant tubes 54. For example, the thermally conductive layer may be, formed by a thermally conductive coating applied to the winding seat 60 and confronting the coolant tube 54. Additionally, embodiments of the invention are envisioned comprising a thermally conductive relationship comprising an air gap between the rotor windings 46 and the coolant tubes 54, as well as embodiments wherein the thermally conductive relationship does not comprise an air gap between the windings 46 and tube 54.

Figure 5:
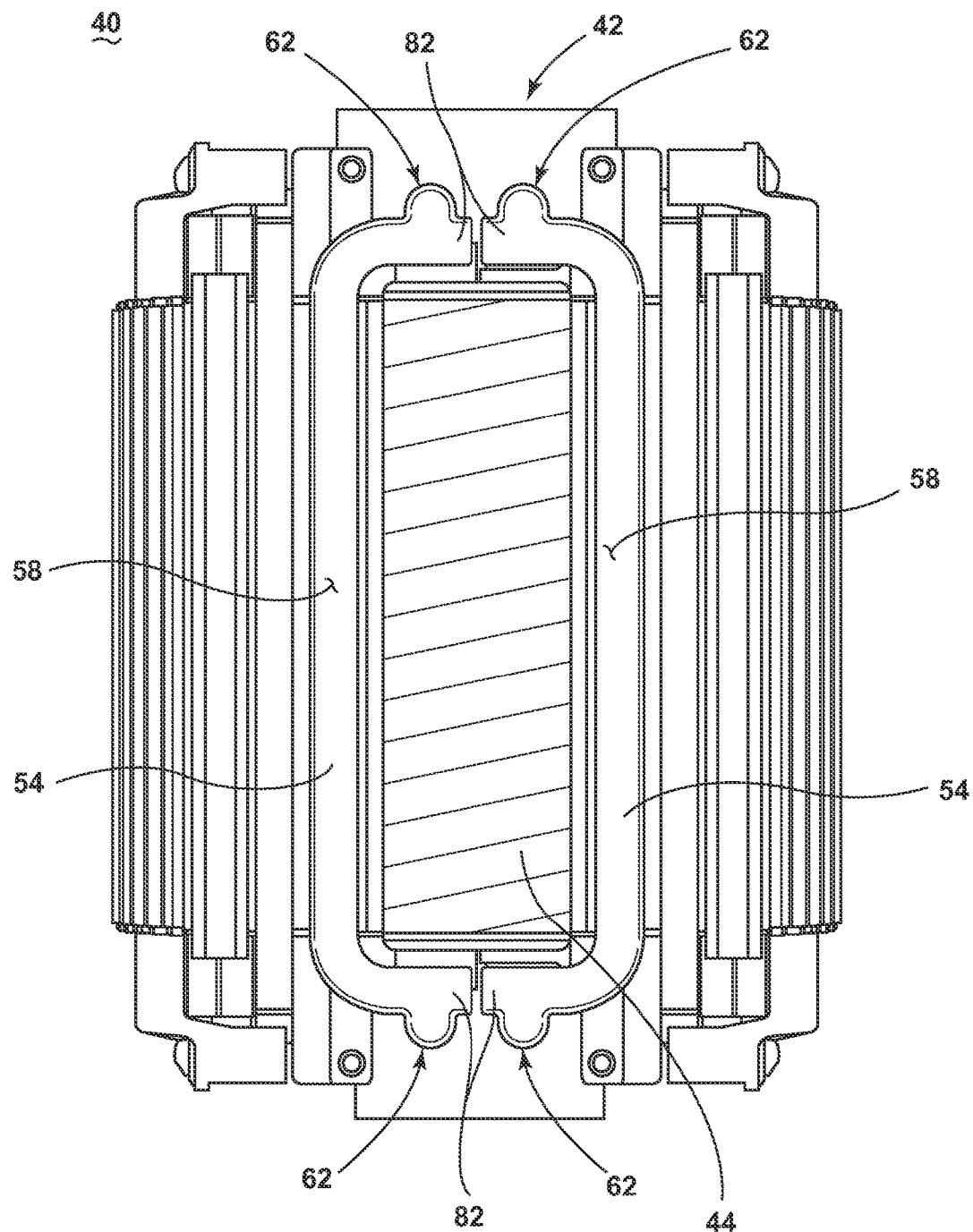
FIG. 5 is a top-down perspective view of the rotor assembly of FIG. 3 sectioned along line 5-5 of FIG. 3, according to a first embodiment of the invention.

FIG. 5 illustrates a top-down perspective view of one embodiment of the rotor assembly 40 with the cap 52 removed, showing the second face 58 and end tube transitions 62 of each coolant tube 54. As shown, each end tube transition 62 may comprise an extended tube portion 82 to define additional second face 58 surface area for thermal conduction with the rotor windings 46. Collectively, it is envisioned that at least 90% of the rotor winding 46 end turn segments 50 are in a thermally conductive relationship with the at least a portion of the coolant tubes 54. However, lesser percentages of coverage will still provide beneficial cooling.

During generating 1 operation, the rotor assembly 40 is rotated about the axis of rotation 34 by a mechanical force, such as a turbine engine, coupled with the rotatable shaft 32. During rotation, the rotor windings 46 and end turn segments 50 are energized to create a pole 48, for example, DC power from a rectified AC power output of the exciter rotor 14. The rotation of the pole 48 relative to the main machine stator 22 generates a power output, such as an AC power output, which is then transmitted by the electrical power cable 30 to an electrical system, for instance, a power distribution node.

The DC current transmitted through the energized rotor windings 46 and end turn segments 50 generates heat in the windings 46 and segments 50. The heat generated in the rotor windings 46 and end turn segments 50 is thermally conducted away from the windings 46 via the thermally conductive layer, such as the fin assembly 76, to the coolant tubes 54 that underlay the windings 46 and segments 50. The rotor assembly 40 is further configured to remove heat conducted to the coolant tubes 54 via coolant traversing through the above described coolant paths and loops. Conventional generators do not provide conductive cooling of the end turn segments 50 via coolant tubes 54 because the coolant tube 54 structure to support said cooling was not present.

As the rotor assembly 40 rotates at the anticipated high rotations per minute (RPMs), the centrifugal forces tend to push the coolant tubes 54 radially outward, which in turn, ensures a firm thermal conduction interface with the windings 46. The collective configuration of the cap 52 and post 44 of the rotor assembly 40 tend to oppose the centrifugal forces on the coolant tubes 54 and rotor windings 46, and help improve the thermal transfer from the windings 46 to the coolant via conduction, by ensuring the winding 46 stays in place and in contact with the tubes 54 and/or thermally conductive layer.

Figure 6:
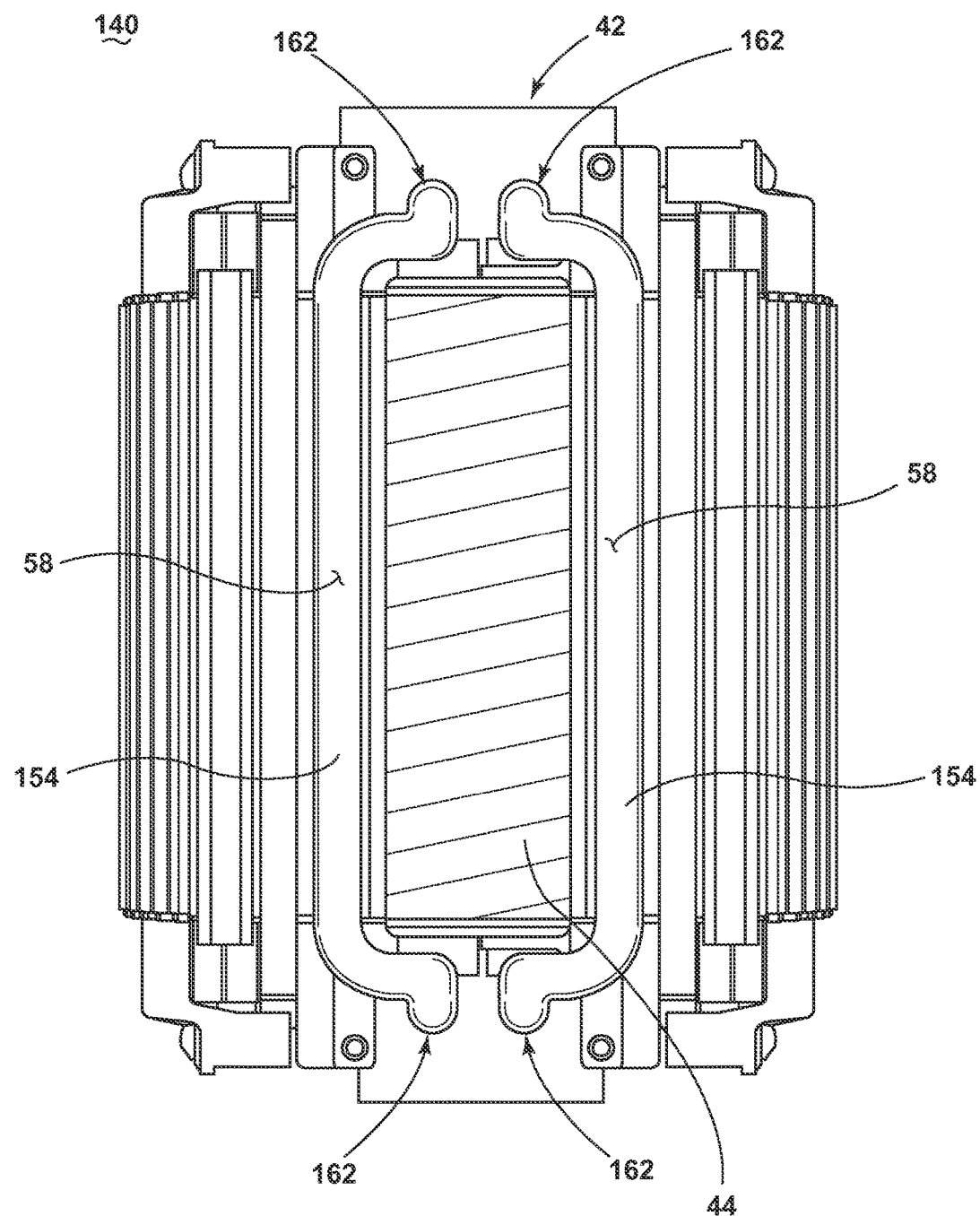
FIG. 6 is a top down perspective view of the rotor assembly according to a second embodiment of the invention.

FIG. 6 illustrates an alternative rotor assembly 140 according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the end tube transitions 162 are alternatively configured such that the end tube transition portion has at least a partially curved, arcuate shape, wherein the transitions 162 bend, curve, and/or extend away from the post 44 and/or end turn segment 50. Correspondingly, the coolant tubes 154 do not include an extended tub portion 82, as shown in the first embodiment.

Figure 7:
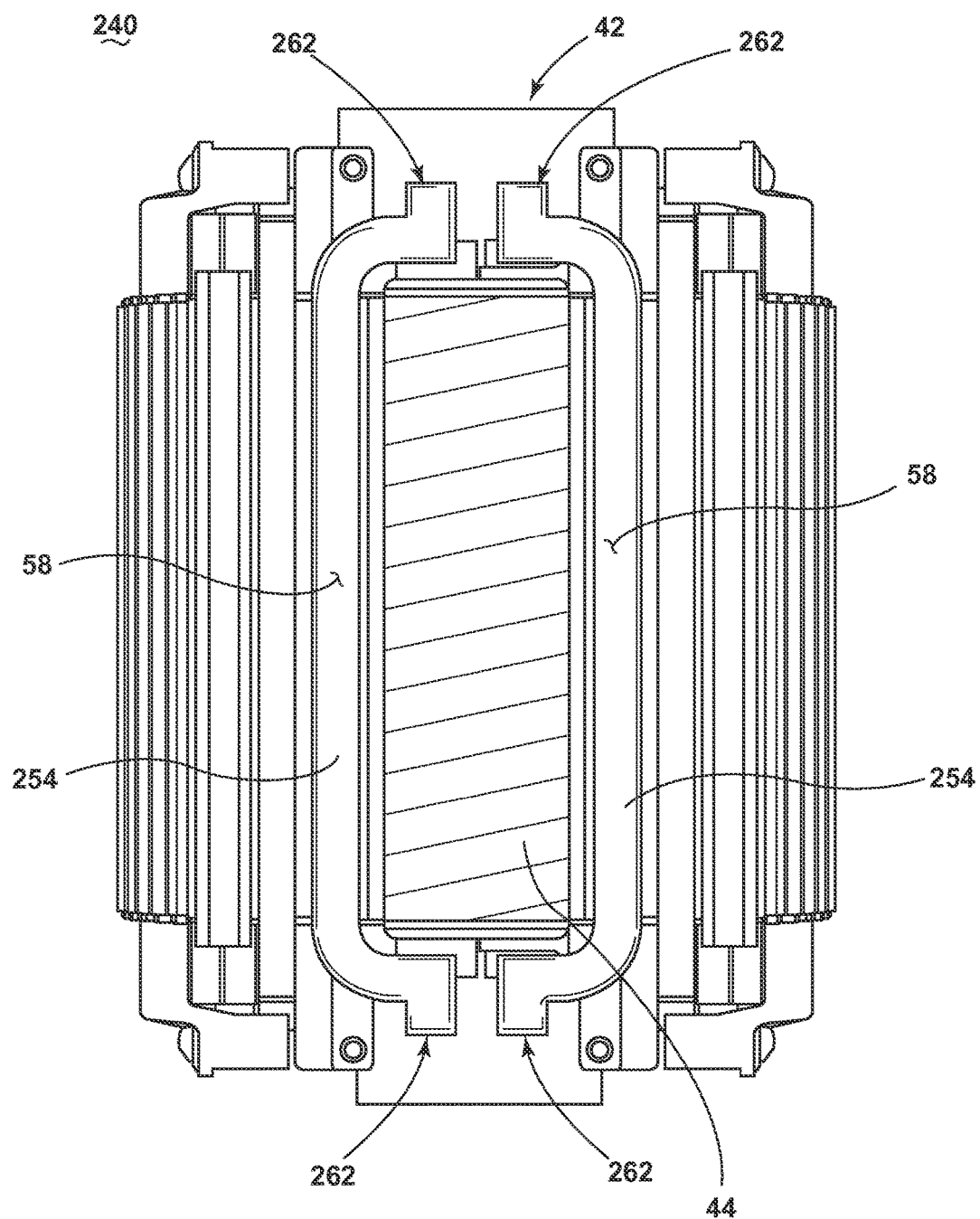
FIG. 7 is a top down perspective view of the rotor assembly according to a third embodiment of the invention.

FIG. 7 illustrates an alternative rotor assembly 240 according to a third embodiment of the invention. The third embodiment is similar to the first and second embodiments; therefore, like parts will be identified with like numerals increased by 200, with it being understood that the descriptions of the like parts of the first and second embodiments apply to the third embodiment, unless otherwise noted. A difference between the third embodiment and the first and second embodiments is that the end tube transitions 262 are configured in squared-off edges. While the second and third embodiments illustrate non-limiting alternative configurations of the end tube transitions 162, 262, many different geometric shapes are envisioned.

Many other possible embodiments and configurations in addition to that shown in the above figures are contemplated by the present disclosure. For example, one embodiment of the invention contemplates more or fewer of the electrical machine assembly 10 components mentioned, such as poles 48, caps 52, rotor windings 46, etc. Another embodiment of the invention contemplates using wedges configured on different sides of the rotor windings 46 to bias the windings 46 into the winding seats 60. Alternatively, additional wedges may be included to bias more than one side of the rotor windings 46 into the winding seats 60. Additionally, the design and placement of the various components may be rearranged such that a number of different in-line configurations could be realized.

The embodiments disclosed herein provide a rotor assembly for an electric machine. One advantage that may be realized in the above embodiments is that the above described embodiments have significantly improved thermal conduction to remove heat from the assembly. The improved thermal conductivity between the rotor windings and the coolant tubes coupled with the coolant paths and/or loops provide for heat removal in a much more effective fashion from the windings to the coolant. Additionally, the extension of the coolant tubes along the end turn segments of the rotor windings provides increased thermal conductivity between the windings and the coolant.

Another advantage of the above embodiments is that the thermally conductive layer provides improved mechanical integrity, along with improved thermal conductivity. The thermally conductive layer, as described, may also provide for a plurality of faces in thermal conduction with the faces of the coolant tubes, providing even yet improved thermal conductivity and thus, a more effective heat removal from the windings to the coolant. The increased thermal dissipation of the rotor assembly allows for a higher speed rotation, which may otherwise generate too much heat. A higher speed rotation may result in improved power generation or improved generator efficiency without increasing generator size.

When designing aircraft components, important factors to address are size, weight, and reliability. The above described rotor assemblies have a decreased number of parts, making the complete system inherently more reliable. This results in possibly a lower weight, smaller sized, increased performance, and increased reliability system. The lower number of parts and reduced maintenance will lead to a lower product costs and lower operating costs. Reduced weight and size correlate to competitive advantages during flight.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor assembly for an electric machine comprising:
    a rotor core having at least one post and a set of coolant passages included in a rotor of the rotor core;
    a winding wound around the post having axial segments that run along a opposite first and second sides of the post, and an end portion extending axially beyond a third side of the post, connecting the axial segments, to define an end turn segment, wherein the post at least partially defines a first face for receiving the winding; and
    a coolant tube, that at least partially encompasses the post and defines a second face for receiving the rotor windings, wherein the coolant tube is located adjacent to, and extending axially in parallel with, the axial segments and at least partially extending in parallel with the end turn segment; and
    an end tube transition that defines a transition portion of the coolant tube, and fluidly couples the coolant tube to the set of coolant passages included in the rotor,
    wherein the coolant tube has at least a portion in a thermally conductive relationship with at least a portion of the end turn segment, wherein heat from the end turn segment is transferred by conduction to the at least a portion of the coolant tube.

2. The rotor assembly of claim 1 wherein at least 90% of the end turn segment is in a thermally conductive relationship with the at least a portion of the coolant tube.

3. The rotor assembly of claim 2 wherein at least 90% of the end turn segment is in a thermally conductive relationship with at least a portion of the multiple coolant tubes, collectively.

4. The rotor assembly of claim 1 further comprising multiple coolant tubes wherein the multiple coolant tubes are in a thermally conductive relationship with at least a portion of each end turn segment.

5. The rotor assembly of claim 1 wherein the end tube transitions extend away from the end turn segment to define the transition portion.

6. The rotor assembly of claim 5 wherein the end tube transition portion has an arcuate shape.

7. The rotor assembly of claim 1 further comprising a thermally conductive layer provided on the winding.

8. The rotor assembly of claim 7 wherein the thermally conductive layer is a coating applied to the winding.

9. The rotor assembly of claim 7 wherein the thermally conductive layer is a fin assembly configured about the winding.

10. The rotor assembly of claim 9 wherein the fin assembly comprises at least two fins in a thermally conductive relationship with multiple faces of the at least one coolant tube.

11. The rotor assembly of claim 1 wherein the thermally conductive relationship does not comprise an air gap.

12. The rotor assembly of claim 1, wherein the coolant tube has substantially trapezoidal geometric cross section.

13. The rotor assembly of claim 1, further comprising at least one of a slot liner or fin assembly configured to provide a thermally conductive relationship between the winding and the coolant tube.

14. A rotor assembly for an electric machine comprising:
    a rotor core having at least one post at least partially defining a first face of a winding seat, and coolant passages included in a rotor of the rotor core;
    a set of coolant tubes encompassing a portion of the at least one post, and at least partially defining a second face of the winding seat;
    a winding wound around the post and at least partially supported by the winding seat, wherein the winding extending axially beyond the post define an end turn segment,
    wherein a portion of the set of coolant tubes is adjacent to, and at least partially in parallel with end turn segment, and in a thermally conductive relationship with at least a portion of the end turn segment; and
    a set of end tube transitions that define transition portions of coolant tubes in the set of coolant tubes, and fluidly couple the set of coolant tubes to the coolant passages included in the rotor.

15. The rotor assembly of claim 14, wherein the end tube transitions extend away from the end turn segment.

16. The rotor assembly of claim 15, wherein the end tube transition portion has an arcuate shape.

* * * * *